United States Patent [19]

Tanabe et al.

[11] Patent Number: 4,591,438

[45] Date of Patent: May 27, 1986

[54] WATER PURIFIER

[75] Inventors: Masatoshi Tanabe, Hitachiota; Kenzo Mikata, Hitachi, both of Japan

[73] Assignee: Hitachi, Ltd., Tokyo, Japan

[21] Appl. No.: 706,180

[22] Filed: Feb. 27, 1985

[30] Foreign Application Priority Data

Feb. 27, 1984 [JP] Japan .................................. 59-34254

[51] Int. Cl.[4] ....................... B01D 23/26; B01D 27/02
[52] U.S. Cl. ..................................... 210/282; 210/422
[58] Field of Search ................ 210/282, 287, 422, 423, 210/424, 435

[56] References Cited

U.S. PATENT DOCUMENTS

| 1,438,983 | 12/1922 | Collin | 210/422 |
| 4,107,046 | 8/1978 | Corder | 210/282 |
| 4,172,796 | 10/1979 | Corder | 210/282 |
| 4,504,389 | 3/1985 | Rundzaitis | 210/424 |

Primary Examiner—Ivars Cintins
Attorney, Agent, or Firm—Antonelli, Terry & Wands

[57] ABSTRACT

A water purifier including a body section, a cartridge section for purifying water, and a spool section. A horizontal water passage which is provided in the main body constituting the body section has a large-diameter portion opened to the outside of the main body and a small-diameter portion connected to the cartridge section. A vertical water passage is provided in the main body in communication with the large-diameter portion and therein a spool sleeve is disposed. A spool body including an "O" ring is provided such as to change the direction of flow of the horizontal water passage by selectively coming into contact with the continuous portion leading from the large-diameter portion to the small-diameter portion and the spool sleeve without making any contact with the edges which communicate the vertical water passage with the large-diameter portion, thereby avoiding the impairment of the "O" ring and lengthening the life of the water purifier.

8 Claims, 7 Drawing Figures

WATER PURIFIER

BACKGROUND OF THE INVENTION

This invention relates to a water purifier, and more particularly, to a water purifier having a spool section for changing the direction of flow of water passages in the body.

In the conventional water purifier of this kind, a horizontal water passage and a vertical water passage are provided in communication with each other within the main body which constitutes the body section and a spool having an "O" ring is movably provided in the horizontal water passage so as to change the direction of flow of the horizontal water passage. However, this water purifier involves a risk of the "O" ring being impaired by coming into contact with the communicating edges of both the water passages.

SUMMARY OF THE INVENTION

Accordingly it is an object of the invention to eliminate this drawback in the prior art and to provide a water purifier having a simple structure and a long life.

To achieve this aim, this invention provides a water purifier 2 including a body section 3, a cartridge section 4 for purifying water, and a spool section 5, comprising: a horizontal water passage 7c which is provided in the main body 7 constituting the body section 3 and which has a large-diameter portion 7f opened to the outside of the main body 7 and a small-diameter portion 7g connected to the cartridge section 4; a vertical water passage 7d which is provided in the main body 7 in communication with the large-diameter portion 7f; a spool sleeve 20 which is disposed within the large-diameter portion 7f; and a spool body 21 including an "O" ring 25 which is arranged in such a manner as to change direction of the flow of the horizontal water passage 7c by selectively coming into contact with the continuous portion 7h leading from the large-diameter portion 7f to the small-diameter portion 7g and the spool sleeve 20 without making any contact with the edges which communicate the vertical water passage 7i with the large-diameter portion 7f.

As described above, the very simple structure of a water purifier according to this invention, in which a spool body 21 is selectively brought into contact with the continuous portion 7h leading from the large-diameter portion 7f to the small-diameter portion 7g and the spool sleeve 20, avoids the possibility of the "O" ring 25 being impaired by coming into contact with the edges which communicate the vertical water passage 7i with the large-diameter portion 7f. This can remarkably lengthen the life of the water purifier 2.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
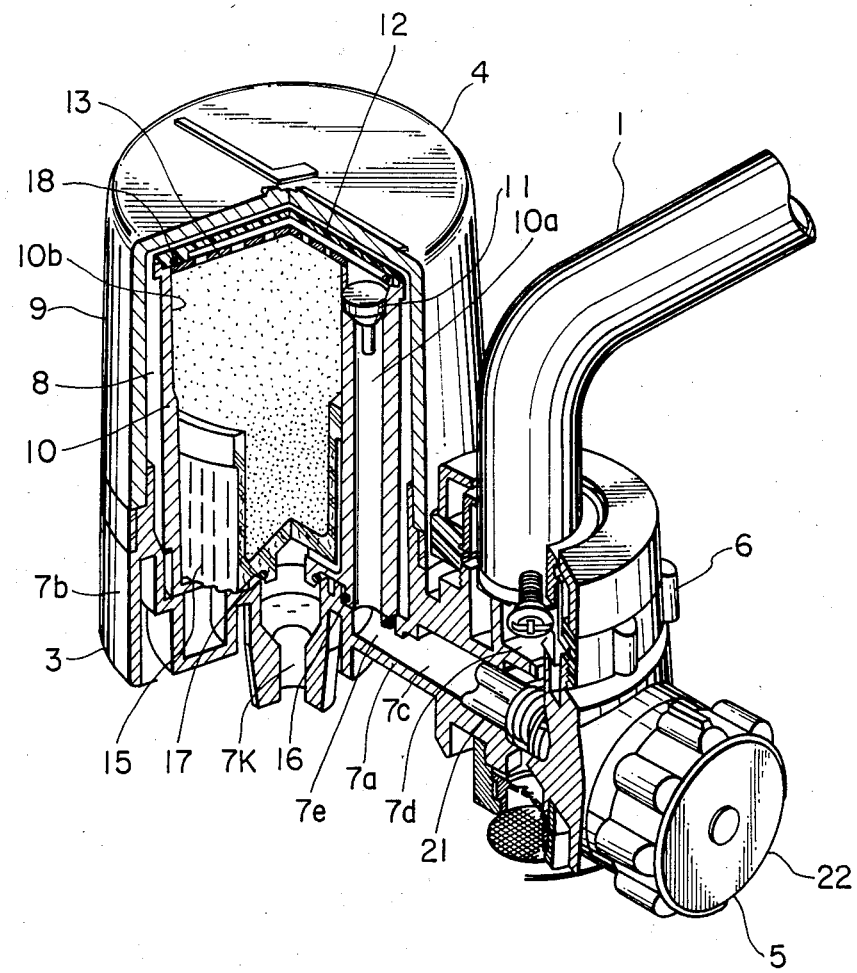
FIG. 1 is a partially cutaway view in perspective of a water purifier according to the invention.

Hereinunder an embodiment of the present invention will be explained with reference to FIGS. 1 to 7. A tap 1 is directly connected to a city water pipe and can be manually opened or closed. A water purifier 2 is composed of a body section 3, a cartridge section 4, a spool section 5 and a tap connecting means 6. The body section 3 is composed of a main body 7 of synthetic resin which is formed by injection molding. The main body 7 consists of a water passage change-over portion 7a and a cartridge receiver 7b. In the water passage change-over portion 7a, a horizontal water passage 7a which extends in the righthand and the lefthand direction is provided such as to communicate with a vertical water passage 7d which extends longitudinally. One end of the horizontal water passage 7c is opened to the side surface of the main body 7 and the other end is communicated to the pure water inlet 7e of the cartridge receiver 7b. The horizontal water passage 7c is concentrically provided with a large-diameter portion 7f on the opening side and with a small-diameter portion 7g on the cartridge side. The vertical water passage 7d is communicated to the large-diameter portion 7f and is opened to the upper and lower surfaces of the main body 7. The continuous portion from the large-diameter portion 7f to the small diameter portion 7g of the horizontal water passage 7c is formed into a smooth arc. The portions 7i and 7j of the vertical water passage 7d which communicate with the hoirzontal water passage 7c are reduced in size. The cartridge receiver 7b is provided with the pure water inlet 7e and a pure water outlet 7k.

The cartridge section 4 consists of a cartridge 8 and a cartridge cover 9. The cartridge 8 is composed of a cylindrical cartridge body 10, a check valve 11, a sealing lid 12, an activated charcoal presser 13, activated charcoal 14, a filter 15, and three "O" rings 16, 17 and 18. The cartridge body 10 has a pure water introducing passage 10a and an activated charcoal chamber 10b which are removably attached to the cartridge receiver 7b through the "O" rings 16 and 17. In the state where the cartridge body 10 is attached, the pure water introducing passage 10a and the activated charcoal chamber 10b are communicated to the pure water inlet 7e and the pure water outlet 7k, respectively. The check valve 11 is disposed within the pure water introducing passage 10a and is opened when water pressure is applied. The sealing lid 12 is attached to the upper surface of the cartridge body 10 through the "O" ring 18 such as to communicate the pure water introducing passage 10a and the activated charcoal chamber 10b. The activated charcoal presser 13 is provided with a multiplicity of small holes 13a and is pressed by a part of the sealing lid 12. The activated charcoal is particulate, and is stored in the activated charcoal chamber 10b.

The cartridge cover 9 is screwed into the cartridge receiver 7b such as to cover the cartridge 8.

Conical indents 10c are formed at two lower portions of the outer peripheral surfaces of the cartridge body 10 such as to engage with two protrusions 7*l* formed on the cartridge receiver 7*b*. The upper end portion of the conical indent 10*c* has a portion 10*c'* the width of which is very slightly wider than the width of the protrusion 7*l*, and the height $l_1$ of which is set to be longer than the portions $l_2$ where protrusions 10*d* and 10*e* formed on the lower surface of the cartridge body 10 overlap the pure water inlet 7*e* and the pure water outlet 7*k*, respectively. The protrusions 7*l* are integrally formed lengthwise on the cartridge receiver 7*b*.

Through holes 7*m* are provided on two parts of the cartridge receiver 7*b*, such that the cartridge 8 can be seen through them. A ring member 19 which is arranged around the through holes 7*m* is transparent only at the portions corresponding to the through holes 7*m*.

The spool section 5 consists of a spool sleeve 20, a spool body 21, a spool dial 22, four "O" rings 23, 24, 25, and 26, a rotation guide member 31 and a spool presser 32. The outer diameter of the spool sleeve 20 is slightly smaller than the inner diameter of the large-diameter portion 7*f* of the water passage change-over portion 7*a*, and the inner diameter of the sleeve 20 is the same as the inner diameter of the small-diameter portion 7*g*. The spool sleeve 20 is arranged in the large-diameter portion 7*f* through the "O" rings 23 and 24, and the fore end portion 20*d* is formed into an arc. A communicating hole 20*a* which connects to the communicating portion 7*j* of the vertical water passage 7*d* is formed on the spool sleeve 20. A protrusion 20*b* for checking rotation is provided on the outer end portion of the spool sleeve 20. This protrusion 20*b* engages with an indent 7*n* of the main body 7. The spool body 21 is disposed within the horizontal water passage 7*c* such as to be freely movable rightwards and leftwards. The fore end portion of the spool body 21 which is situated in the small-diameter portion 7*g* has a star-shaped cross section. Two rubber "O" rings 25 and 26 are attached to the outer periphery of the spool body 21. One "O" ring 25 comes into contact with the continuous portion 7*h* leading from the large-diameter portion 7*f* to the small-diameter portion 7*g* of the water passage change-over portion 7*a* when the sleeve body 21 is pushed to the right, and comes into contact with the arcuate fore end portion 20*d* when it is drawn to the left. The other "O" ring 26 constantly comes into contact with the inner surface of the spool sleeve 20 and is arranged on the left on the communicating hole 20*a*. A projection 21*a* provided on the spool body 21 engages the indent 20*b* of the spool sleeve 20 such as to check the rotation of the spool body 21. A rotation guide protrusion 21*b* is formed at a portion of the spool body 21 projecting from the main body 7. A rotation guide member 31 is provided on the inner surface thereof with a spiral groove 31*a*, into which the rotation guide protrusion 21*b* is inserted. It is to maintain the strength of the rotation guide member 31 by improving the slip of the protrusion 21*b* and thereby preventing the run-off of grease charged therewithin that the spiral groove 31*a* is provided on the inner surface. Further, the rotation guide member 31 has a flange 31*b*, which is clamped between the main body 7 and the spool presser 32. The spool presser 32 is attached to the main body 7 through fixture portions 32*a*. The spool dial 22 is secured to one end of the rotation guide member 31 by press fitting.

The tap connecting means 6 attaches the body section 3 to the tap 1, and it is removed together with the body section 3 by loosening a screw 27.

The flow of untreated water and pure water in this water purifier 2 will now be explained in the following.

Figure 2:
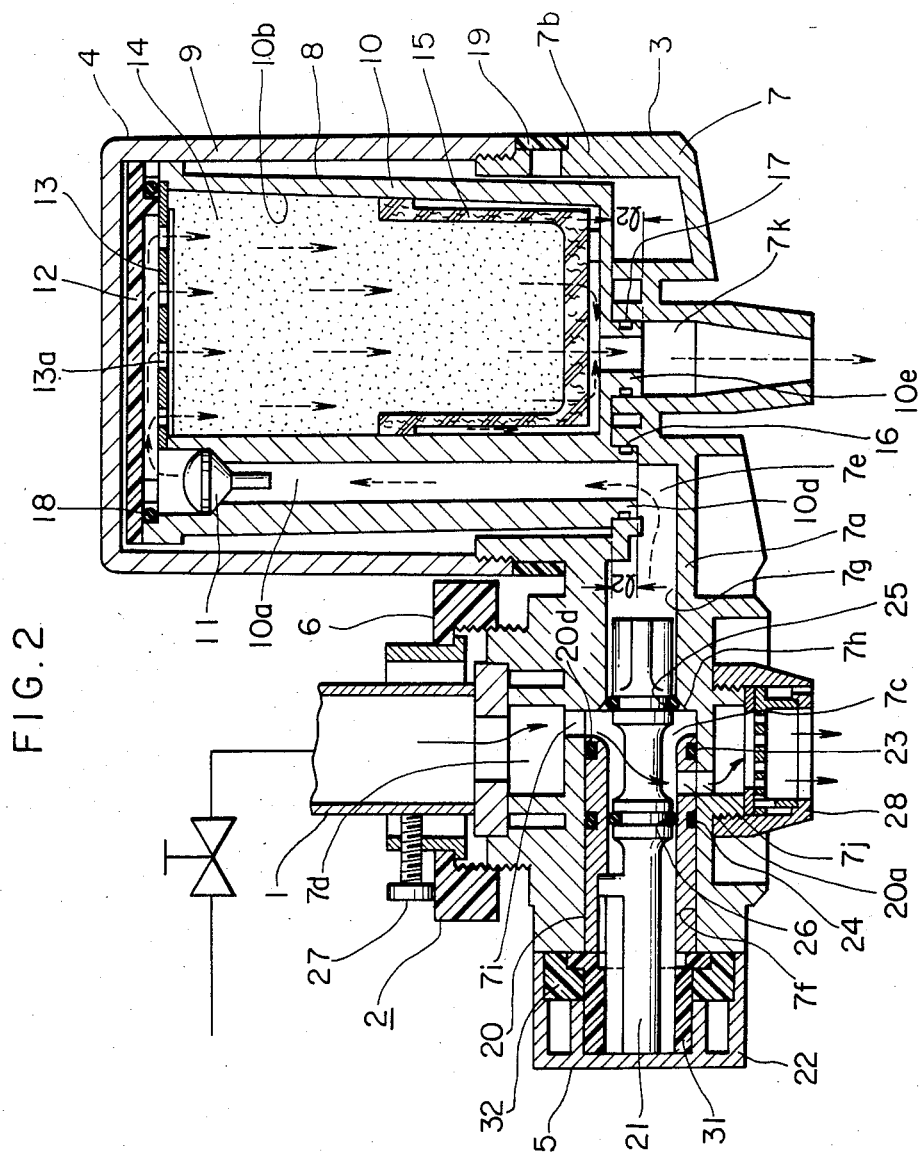
FIG. 2 is a sectional view of the water purifier vertically cut away through the center line.
Figure 3:
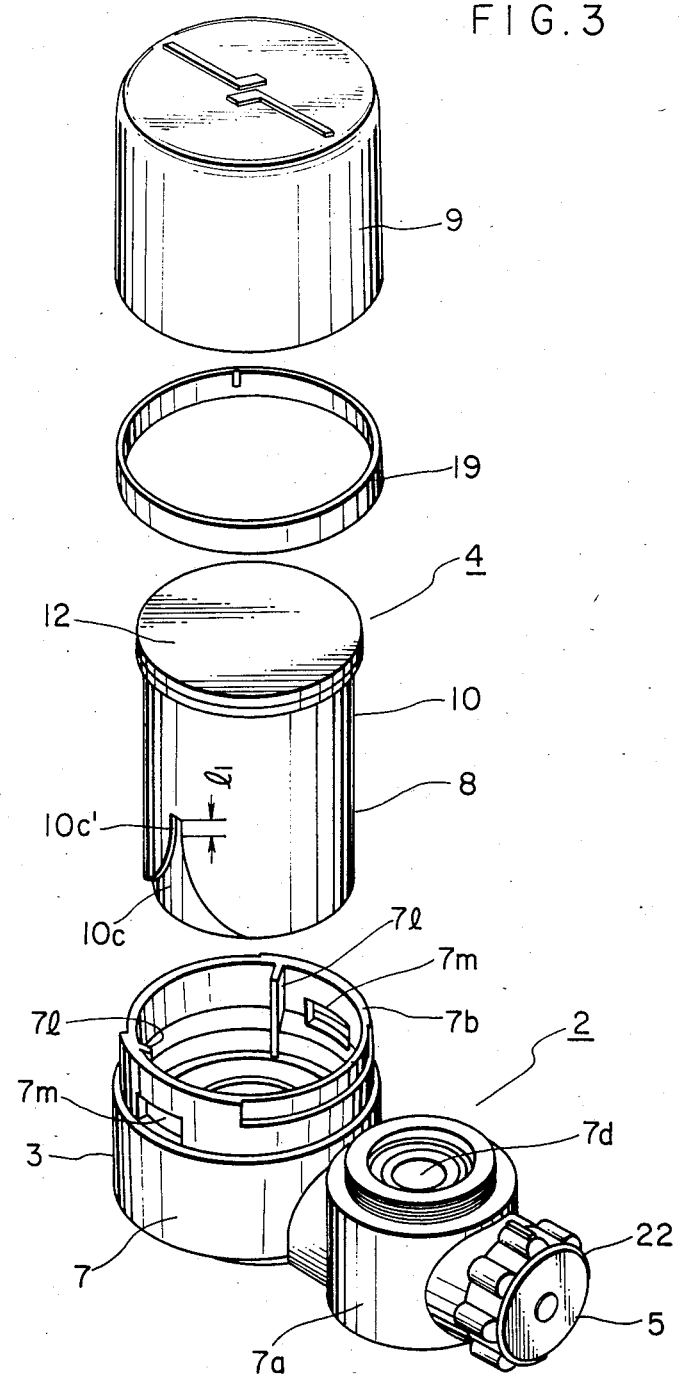
FIG. 3 is an exploded perspective view of the water purifier.
Figure 4:
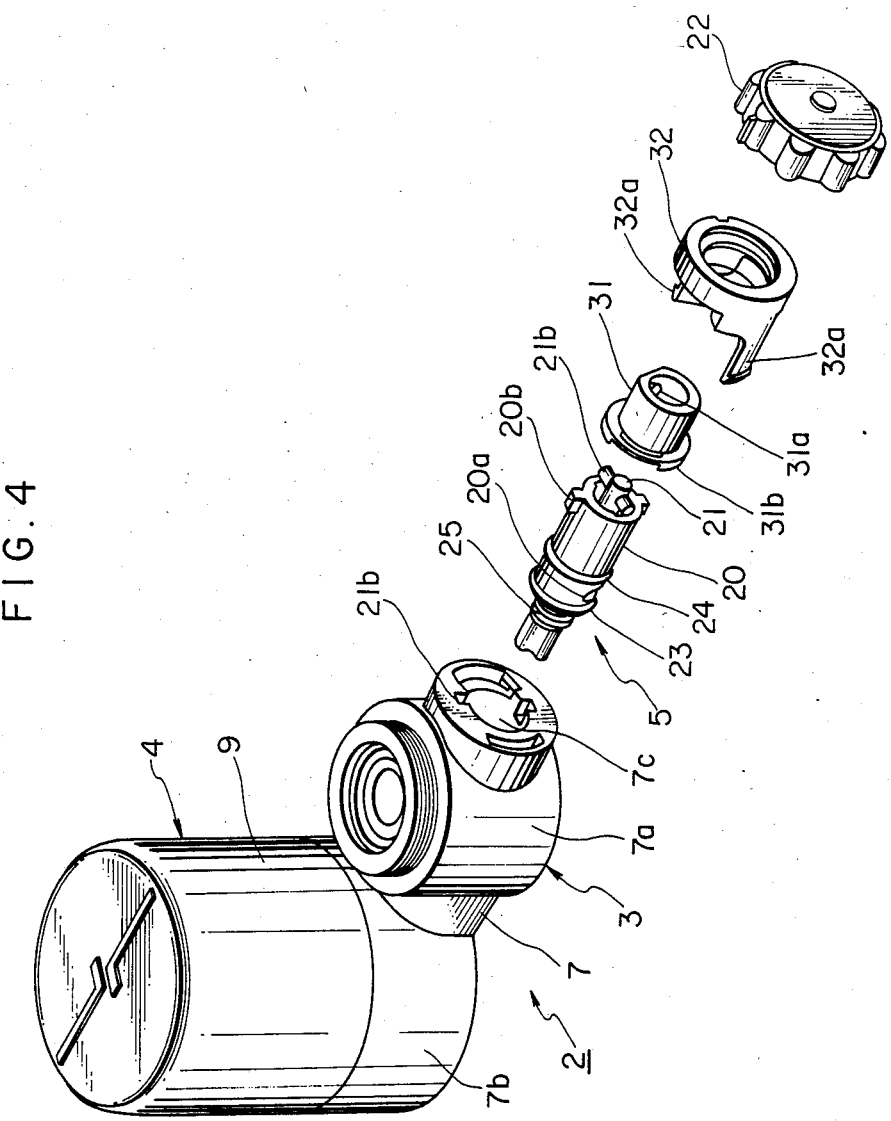
FIG. 4 is an exploded perspective view of the spool section of the water purirer.
Figure 5:
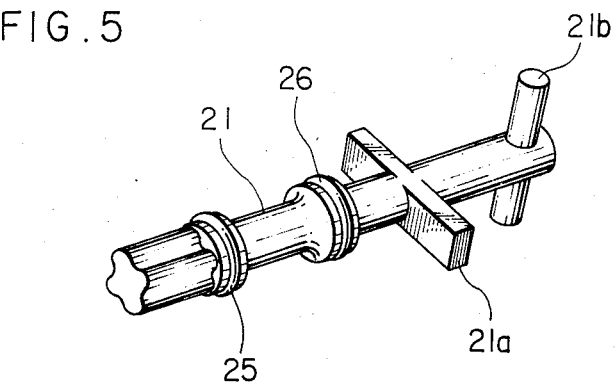
FIG. 5 is a perspective view of the spool body used for the water purifier.
Figure 6:
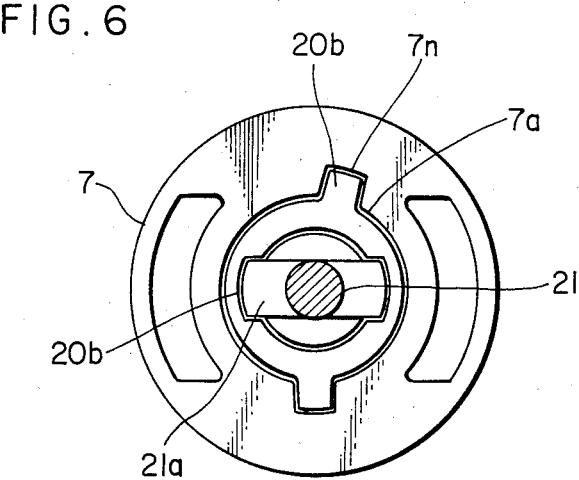
FIG. 6 is a sectional view of the spool section of the water purifier.
Figure 7:
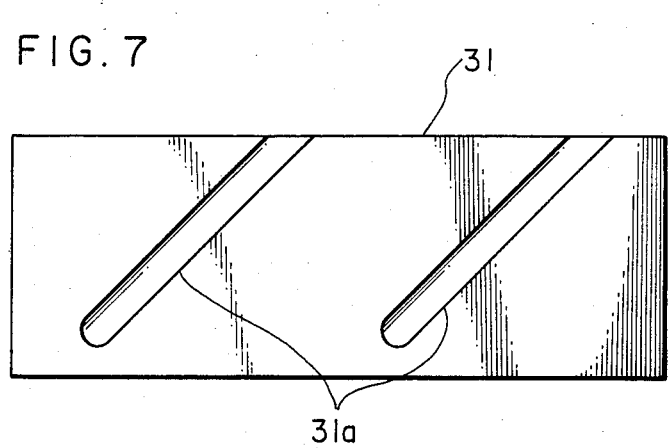
FIG. 7 is a development of the rotation guide member used for the water purifier.

First, in the case of taking out untreated water, the rotation guide member 31 is rotated by rotating the dial 22, whereby the protrusion 21*b* of the spool body 21 moves in the axial direction along the spiral groove 31*a*, assuming the state illustrated in FIG. 2. In other words, the "O" ring 25 which is attached to the spool body 21 comes into contact with the arcuate surface of the continuous portion 7*h* leading from the large-diameter portion 7*f* to the small-diameter portion 7*g* of the main body 7. Then, in the horizontal water passage 7*c*, the communication to the right of the portion where the "O" ring 25 is situated is closed and the communicating portions 7*i* and 7*j* of the vertical water passage 7*d* are communicated through the central portion of the horizontal water passage 7*c* and the communicating hole 20*a* of the spool sleeve 20. If the tap 1 is opened in this state, the untreated water from the water pipe is allowed to flow out from an untreated water outlet 28 in its untreated state without passing through the cartridge section 4.

Next, in the case of supplying pure water, the rotation guide member 31 is reversely rotated by rotating the dial 22 in the reverse direction, whereby the protrusion 21*b* of the spool body 21 is reversely moved in the axial direction along the spiral groove 31*a*. When the "O" ring 25 comes into contact with the arcuate surface of the fore end portion 20*d* of the spool sleeve 20, the communication of the horizontal water passage 7*c* to the left of the spool sleeve 20 is closed, and the communicating portion 7*i* of the vertical water passage 7*d* is communicated with the portion of the horizontal water passage 7*c* which is right of the spool sleeve 20. If the tap 1 is opened in this state, the untreated water from the water pipe passes from the vertical water passage 7*b* through the horizontal passage 7*c* to the pure water inlet 7*e*, and flows along the route indicated by the dotted line arrows in FIG. 2. In other words, the untreated water passes through the pure water introducing passge 10*a*, pushes up the check valve 11, goes to the lower surface of the sealing lid 12, and penetrates the activated charcoal 14 through the holes 13*a* of the activated charcoal presser 13. After the water is purified by the charcoal 14, it passes through the filter 5 and flows out from the pure water outlet 7*k* as pure water.

When the water purifying function of the cartridge 8 is deteriorated, or more concretely, when the water purifying function of the activated charcoal 14 is deteriorated, the cartridge 8 is renewed. Replacement is conducted as follows. The cartridge cover 9 is first removed from the cartridge receiver 7*b*. Thereafter a new cartridge 8 is attached to the cartridge receiver 7*b* from above. In this case, by engaging the two conical indents 10*b* formed on the outer peripheral surface of the cartridge body 10 with the two protrusions 7*l* of the cartridge receiver 7*b*, the cartridge 8 can be automatically attached to a predetermined position of the cartridge receiver 7*b*. Since the conical indents 10*c* are provided on the outer peripheral surface of the cartridge body 10, this fact can be easily confirmed by the user. In addition, since the indents 10*c* are conical and have a wide entrance, the protrusions 7*l* can be inserted into the indents 10*c*, even when the cartridge 8 is being attached in a position slightly askew from its correct receiving position within the cartridge receiver 7*b*, whereby the position of the cartridge 8 can be finely adjusted along the protrusions 7*l*. Furthermore, since the upper end portion of the conical indent 10c has the portion 10c the width of which is very slightly wider than the width of the protrusion 7l, and the height $l_1$ of which is set to be longer than the portions $l_2$ where protrusions 10d and 10e formed on the lower surface of the cartridge body 10 overlap the pure water inlet 7e and the pure water outlet 7k, respectively, the protrusions 10d and 10e are vertically accomodated in the pure water inlet 7e and the pure water outlet 7k with a tight fitting. Still further, the protrusions 7l which are integrally formed lengthwise on the inner surface of the cartridge receiver 7b bring about a reinforcing effect for the benefit of the cartridge receiver 7b.

As described above, according to the invention, the horizontal water passage 7c having the large-diameter portion 7f and the small-diameter portion 7g is provided in the main body 7 constituting the body section 3 with the small-diameter portion 7g communicated to the cartridge section 4 and the large diameter portion 7f opened to the outside of the main body 7, the vertical water passage 7d being provided in the main body 7 in communication with the large-diameter portion 7f, the spool sleeve 20 is disposed within the large-diameter portion 7f, and the spool body 21 having the "O" ring 25 being movably disposed such as to change the direction of flow of the horizontal water passage 7c by selectively coming into contact with the continous portion 7h leading from the large-diameter portion 7f to the small-diameter portion 7g and the spool sleeve 20 without making any contact with the edges which communicate the vertical water passage 7i with the large-diameter portion 7f. This structure eliminates the risk of impariring the "O" ring 25 and remarkably lengthens the life of the water purifier. Since the "O" ring 25 is in the form of a single ring concentric with the spool body 21, there is no probability of the "O" ring 25 loosening from the spool body 21. In addition, since the "O" ring 25 comes into contact with the continuous smooth arcuate portion 7h and the spool sleeve 20, the "O" ring 25 is able to exhibit a good water sealability and suffers little from deterioration as a result of wear. Even if the "O" ring 25 becomes worn after long use, the contacting force necessary for water sealing is constantly secured by increasing the movable distance of the spool body 21. While untreated water or pure water is flowing, water pressure is applied on the "O" ring 25 in the direction of intensifying the water sealing effects, which provides securer water sealing properties and is effective in enhancing the resistance to wear of the "O" ring 25.

To sum up, according to this invention, the very simply structure in which a spool body 21 is selectively brought into contact with the continuous portion 7h leading from the large-diameter portion 7f to the small-diameter portion 7g and the spool sleeve 20, avoids the possibility of the "O" ring 25 being impaired by coming into contact with the edges which communicate the vertical water passage 7i with the large-diameter portion 7f. This can remarkably lengthen the life of the water purifier 2.

While description has been given of what is at present considered to be a preferred embodiment of the invention, it will be understood that various modifications may be made thereto, and it is intended that the appended claims cover all such modifications as fall within the true spirit and scope of the invention.

What is claimed is:

1. A water purifier including a body section, a cartridge section for purifying water, and a spool section, comprising:
   a horizontal water passage which is provided in a main body constituting said body section and which has a large-diameter portion opened to the outside of said main body and a small-diameter portion connected to said cartridge section;
   a vertical water passage which is provided in said main body in communication with said large-diameter portion;
   a spool sleeve which is disposed within said large-diameter portion; and
   a spool body including an "O" ring which is provided such as to change the direction of flow of said horizontal water passage by selectively coming into contact with a continuous portion leading from said large-diameter portion to said small-diameter portion and said spool sleeve, without being brought into contact with the edges which communicate said vertical water passage with said large-diameter portion.

2. A water purifier according to claim 1, wherein said main body is formed of synthetic resin by injection molding, and a cartridge receiver is provided in a part of said main body.

3. A water purifier according to claim 1, wherein said continuous portion leading from said large-diameter portion to said small-diameter portion is formed into a smooth arc.

4. A water purifier according to claim 1, wherein the outer diameter of said spool sleeve is made slightly smaller than the inner diameter of said large-diameter portion of the water passage change-over portion, the inner diameter of said spool sleeve is made the same as the inner diameter of said small-diameter portion, "O" rings are provided around the outer periphery of said spool sleeve, and the fore end portion of said spool sleeve is formed in an arc.

5. A water purifier according to claim 1, wherein the fore end portion of said spool body is arranged within said small-diameter portion of said horizontal water passage, and said fore end portion of said spool body is made to have a star-shaped cross section.

6. A water purifier according to claim 1, wherein two rubber "O" rings are attached to the outer periphery of said spool body, with one "O" ring selectively brought into contact with said continous portion leading from said large-diameter portion to said small-diameter portion of said horizontal water passage and said spool sleeve, and the other "O" ring constantly brought into contact with the inner surface of said spool sleeve.

7. A water purifier according to claim 1, wherein a projection for checking rotation is provided around the outer periphery of said spool body, and said projection is engaged with an indent of said spool sleeve.

8. A water purifier according to claim 1, wherein a dial which is rotatable by means of a mechanism which converts rotation movement into axial movement is attached to said spool body.

* * * * *